Figure 1:
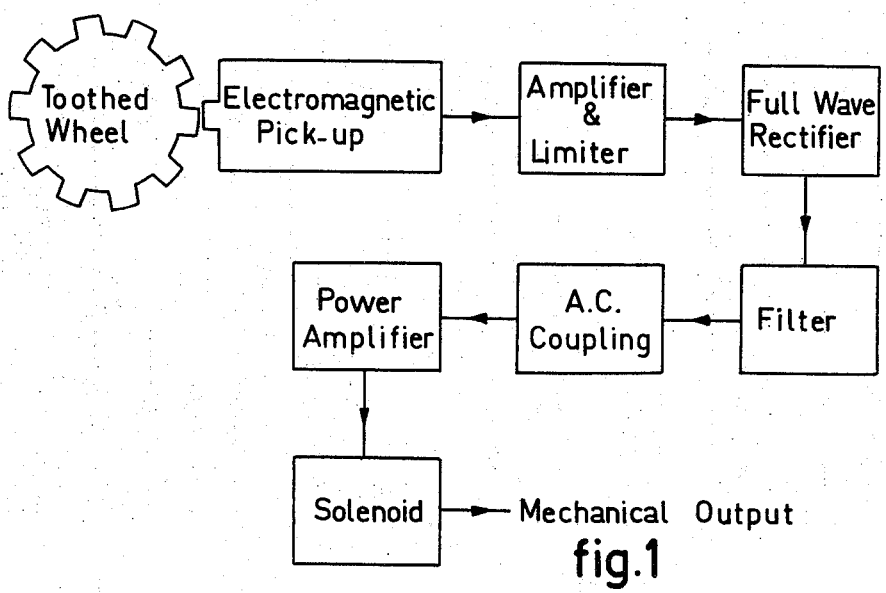

United States Patent

[11] 3,563,611

| [72] | Inventor | Denis Sharp |
| | | Crawley, Sussex, England |
| [21] | Appl. No. | 757,255 |
| [22] | Filed | Sept. 4, 1968 |
| [45] | Patented | Feb. 16, 1971 |
| [73] | Assignee | by mesne assignments, to |
| | | U. S. Philips Corporation |
| | | New York, N.Y. |
| [32] | Priority | Sept. 4, 1967 |
| [33] | | Great Britain |
| [31] | | 40348/67 |

[54] VEHICLE BRAKE SYSTEMS
10 Claims, 2 Drawing Figs.

[52] U.S. Cl. .................................... 303/21;
303/20
[51] Int. Cl. .................................... B60t 8/08

[50] Field of Search ............................. 303/20, 21

[56] References Cited
UNITED STATES PATENTS

| 3,026,148 | 3/1962 | Ruof ............................ | 303/21(BE) |
| 3,245,727 | 4/1966 | Anderson et al. .............. | 303/21(A4) |
| 3,260,555 | 7/1966 | Packer ......................... | 303/21(BB) |
| 3,398,995 | 8/1968 | Martin ......................... | 303/21(A4) |

*Primary Examiner*—Duane A. Reger
*Attorney*—Frank R. Trifari

ABSTRACT: An antilock brake control system that includes means for producing a constant amplitude DC signal for all wheel speeds above 6 m.p.h. When the speed drops below 6 m.p.h., the amplitude of the DC signal changes. This voltage change is coupled to the brake release solenoid via a capacitor.

3,563,611

INVENTOR.
DENIS SHARP

VEHICLE BRAKE SYSTEMS

This invention relates to vehicle brake systems and more particularly to antilock brake systems, i.e. systems designed to improve braking performance by releasing a wheel brake automatically if the wheel tends to lock on a slippery surface and then permitting further braking action without the need for any change in the action of the person using the brake. Such systems can be successful in reducing the risk of skidding due to wheel lock and maintaining directional control and can also reduce braking distances.

Known antilock brake systems employ:

1. A device which senses wheel deceleration.
2. Apparatus for switching when the deceleration exceeds a certain value.
3. A mechanical brake release servo controlled by said switching.

Thus, hitherto, it has been regarded as essential to measure wheel deceleration in order to derive an antilock brake control system. The present invention is based on the the discovery that equal results (and sometimes even better results for certain types of mechanical actuator) can be obtained without measuring deceleration.

The invention provides an antilock control system comprising:

a. sensing means for generating an electric signal in response to wheel movement;
b. means for processing said signal so as to convert it substantially into a DC signal having approximately constant amplitude for all wheel speeds above a predetermined threshold speed;
c. means for providing energizing currents for a solenoid adapted to actuate an antilock brake release servo, said currents being produced in response to a sudden change in the amplitude of the DC signal; and
d. means for limiting the time during which any one antilock brake release current is allowed to flow in the solenoid.

Systems according to the invention are advantageous in that they permit the use of very simple and cheap wheel movement sensing means. All that is needed is the detection of movement, i.e. the distinction between the static state of the wheel and wheel motion, there being no need to measure speed or deceleration. In theory the system could detect any wheel movement, however slow. In practice it is virtually impossible to detect absolute zero speed or to detect it sufficiently rapidly for use in a fast servo system. However, the use, in the practice of the invention, of a very low finite threshold speed (preferably less than 6 m.p.h. and typically 3 or 4 m.p.h.), instead of zero speed, permits the system effectively to predict or anticipate any drop of wheel speed to zero and to initiate antilock action before wheel lock occurs.

Parts a and b of the system can be constituted by a wheel-driven DC generator followed by an amplitude limiter. However, it is more economical to use a wheel-driven AC generator adapted to provide an approximately rectangular waveform. The parts a—b of the system include an amplitude limiter, a full-wave rectifier and a filter for removing pulses corresponding to the changes of polarity in the output of the generator. Preferably said waveform has voltage reversal times which are small compared with the time constants of the circuit.

Part c of the system may comprise an AC coupling as will be explained, in which case it acts also as part d.

Part d of the system is provided to prevent the risk of the vehicle drifting at a very low speed (i.e. a speed lower than the threshold speed) in a condition in which application of the brake is continuously inhibited by the antilock system.

In the case of a four-wheeled vehicle the system may include a separate control servo for each wheel or, alternatively, a separate control servo for each of the two front wheels and a further control servo associated jointly with the two rear wheels. The wheel speed sensor means may follow a similar pattern: in particular, in the latter case a single sensor may be provided on the drive shaft and associated with two rear wheels driven thereby. However, these considerations do not affect the explanation of the mode of operation of the system and therefore the examples described below can be regarded, for simplicity, as based on the provision of a complete antilock system for each wheel.

In the example described below, a rotating toothed ring is attached to the revolving wheel. A stationary electromagnetic pickup (having a pole and a coil) is used to sense the change of flux as each tooth is succeeded by a gap, and the instantaneous voltage is an indication of wheel movement.

In the case of a toothed wheel generator, the voltage is ideally a square wave and this can be approximated by suitably shaping the pickup pole or the wheel teeth.

The square wave voltage is fed into a circuit which gives an output when the voltage falls to zero. Since a true square wave has a zero value for zero time, an output is only present in the absence of the true square waves. In practice a true square wave is unobtainable directly from the pickup and there is a finite time when the voltage is zero (or negligible) during which a short unwanted output pulse will be supplied by the circuit at each voltage reversal. These short pulses are filtered out e.g. by means of a capacitor.

When the output from the pickup coil is zero for a time longer than the duration of the short pulses, the circuit switches the solenoid in the mechanical brake release mechanism.

The overall action is such as to ensure that the wheel movement "holds off" the antilock mechanism. Conversely, in the absence of countermeasures, the antilock solenoid would be energized whenever the wheel is at rest. This would normally mean that it is not possible to apply the brakes when the vehicle was stationary. However, an AC coupling is used (as aforesaid) so that the solenoid can only be energized for a short time under any circumstances. This also allows the circuit to "fail-safe."

In the same way that the antilock system removes the brake at the instant the wheel is at rest, the brakes are reapplied at the instant the wheel starts to turn. Theoretically this would hold the wheel locked or at a very low speed. In practice, in hydraulic systems the time taken to mechanically restore fluid pressure is sufficient to allow most wheels to accelerate to a reasonable value before being rebraked.

This inherent time delay can be artificially increased for wheels having high inertia or for wheels loaded with the inertia of the vehicle transmission. It may also be of benefit to increase the time for slippery surfaces where the restoring or accelerating torque is low.

Figure 2:
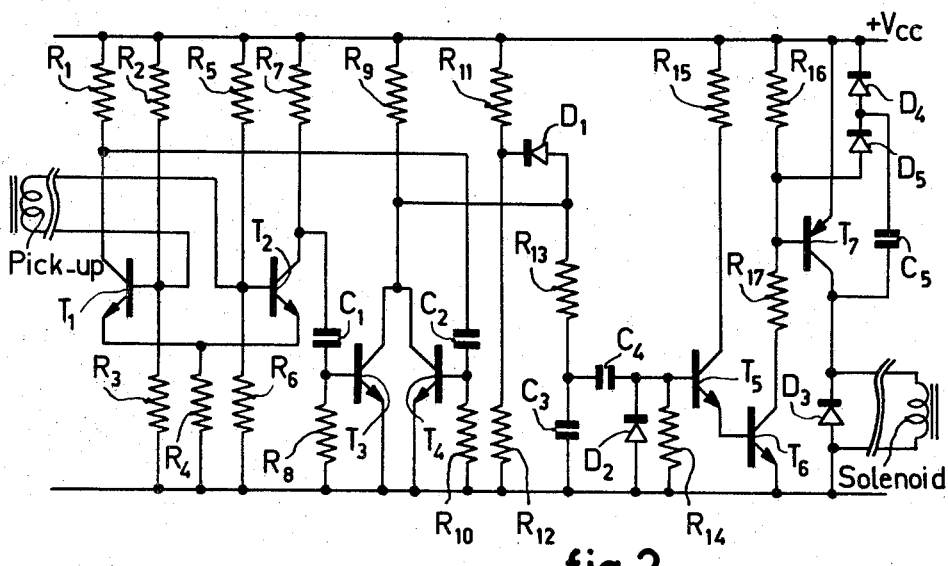

Specific embodiments of the invention will now be described with reference to the accompanying drawings in which:

FIG. 1 is a block diagram of the invention; and
FIG. 2 is a schematic diagram showing the circuit details of FIG. 1.

The components of a system are shown in FIG. 1. The toothed wheel is attached to, and rotates with, the car wheel. An electromagnetic pickup is mounted next to the toothed wheel and produces an alternating output when the wheel rotates. This output should ideally be a square wave and this can be approximated by suitably shaping the teeth on the wheel, the pickup pole, or a combination of the two. The output from the pickup is amplified, limited, and full-wave rectified to produce a steady DC voltage which drops momentarily to zero when the alternating output from the pickup passes through zero every half cycle. These short voltage spikes are filtered out, e.g. by a combination of capacitors and resistors so that the output from the filter is smooth.

If the car wheel (and hence the toothed wheel) should stop, then the output from the pickup would fall to zero and the output of the fullwave rectifier would also fall to zero after a short delay due to the capacitive filter. This sudden change in output from the rectifier is fed to the power amplifier by an AC coupling circuit which is usually capacitive, but could alternatively be inductive.

The maximum length of time the solenoid can remain energized is limited by the time constant of the AC coupling. Under normal antilock operation, the solenoid will be deenergized by the wheel starting to rotate again after it has been locked. The length of time taken by the mechanical system to reapply the brakes will normally be sufficient to allow the wheel to accelerate to a speed near that of the vehicle. If more time is needed to accelerate due to the wheel having a high inertia, this can be provided by electronic means within the circuit or by fitting dampers to the brake servo. Results indicate that it is desirable to reapply the brakes as fast as possible, particularly (in the case of rear drive) on the front wheels which do not have any transmission inertia.

When the vehicle finally comes to rest, the short length of time that the solenoid is energized and the brakes released, is insufficient to allow the wheel (and hence the vehicle) to accelerate to a speed which would operate the antilock mechanism a second time when the vehicle stopped again.

It should be noted that the circuit is not critical as to the number of teeth per revolution provided by the toothed wheel.

An example of a circuit suitable for the system of FIG. 1 will now be described with reference to FIG. 2.

Transistors $T_1$ and $T_2$ are connected as a differential DC amplifier, the pickup coil being connected between the two bases. The outputs from the two collectors are in antiphase to each other, i.e. when one goes positive the other goes negative. These two outputs are coupled to the bases of transistors $T_3$ and $T_4$ by capacitors $C_1$ and $C_2$. When the wheel W is rotated and the pickup PU produces an output, then either $T_3$ or $T_4$ is turned on every half cycle so that the collector voltage remains substantially at the saturation voltages of the transistors (about 100 mv.). Capacitor $C_3$ filters out the positive voltage spikes on the collectors of $T_3$ and $T_4$ as the alternating output from the pickup PU changes sign every half cycle.

When the wheel W stops and there is no output from the pickup PU, both $T_3$ and $T_4$ turn off and the collector voltages go positive at a rate determined by the collector load and the capacitor $C_3$. The change in collector voltage causes a current to flow through the AC coupling capacitor $C_4$ which turns on transistors $T_5$, $T_6$ and $T_7$ of the power amplifier. The length of time the power amplifier is turned on is determined by how far the collectors of $T_3$ and $T_4$ are allowed to go positive (also to some extent upon the value of $C_4$). This is limited by the diode D1 connected between the collectors of $T_3$ and $T_4$ and the potential divider ($R_11 - R_12$) which limits the voltage swing to about 3v.

The power amplifier is normally turned off when the wheel W starts to rotate again, thereby causing the pickup PU to produce an output voltage which turns on either $T_3$ or $T_4$. A delay can be introduced, if needed, in turning off the solenoid S and this can be done by means of a capacitor $C_5$.

One practical set of values and components is given below by way of illustration.

TABLE

| Transistors | Diodes |
|---|---|
| T1=BC109 | D1=OA47 |
| T2=BC109 | D2=OA47 |
| T3=BC109 | D3=BYZ10 |
| T4=BC109 | D4=BYZ10 |
| T5=BC109 | D5=BYZ10 |
| T6=BFY52 | |
| T7=ADY26 | |

| Resistors | Capacitors |
|---|---|
| R1=2.2k | C1=320µf. |
| R2=12k | C2=320µf. |
| R3=10k | C3=10µf. |
| R4=1k | C4=10µf. |
| R5=12k | C5=See note below. |
| R6=10k | |
| R7=2.2k | |
| R8=2.7k | |
| R9=10k | |

Continued

| | Supply Voltage |
|---|---|
| R10=2.7k | Vcc=12v. |
| R11=8.2k | |
| R12=2.2k | |
| R13=150 ohms | |
| R14=33k ohms | |
| R15=150 ohms | |
| R16=5 ohms | |
| R17=12 ohms | |

In the above table the value C5 is omitted because the value needed for C5 depends upon the inertia of the wheel of the vehicle and on the speed of response of the mechanical servo which modulates the brake pressure. In some cases C5 will not be needed, in which case diodes D4 and D5 can also be removed.

The solenoid is used to actuate an antilock device which may be of the type described in U.S. Pat. No. 3,389,939 and U.S. Pat. No. 3,495,879.

I claim:

1. An antilock brake control system for a vehicle wheel comprising, sensing means arranged to generate an electric signal in response to movement of the wheel, means responsive to said signal for producing a DC signal having an approximately constant amplitude for all values of wheel speed above a predetermined threshold speed, means responsive to said DC signal for providing an energizing current for a solenoid adapted to actuate an antilock brake release servodevice, said current being produced in response to a change in the amplitude of the DC signal that occurs when the wheel speed drops below said predetermined threshold speed, and means for limiting the time period during which the solenoid current is allowed to flow.

2. A system as claimed in claim 1 wherein said sensing means comprises a wheel-driven AC generator adapted to produce an approximately rectangular voltage waveform.

3. A system as claimed in claim 2 wherein said DC signal producing means comprises, in cascade, an amplitude limiter coupled to the output of the AC generator, a full-wave rectifier and a filter for removing the voltage pulses that occur when the polarity of the generator output voltage changes.

4. A system as claimed in claim 1 wherein said solenoid current providing means is designed so that said predetermined threshold speed corresponds to a wheel speed of 6 miles per hour.

5. A system is claimed in claim 1 wherein said solenoid current providing means and said limiting means includes AC coupling means connected in circuit between said DC signal producing means and said solenoid.

6. A system as claimed in claim 5 wherein said AC coupling means comprises a capacitor.

7. An antilock brake control system for a vehicle wheel comprising, transducer means arranged to generate an AC signal in response to the wheel movement, amplifier means coupled to said transducer means for producing a constant amplitude DC signal for all values of wheel speed above a given low threshold speed, the amplitude of said DC signal being caused to change when the wheel speed falls below said given threshold speed, a solenoid adapted to actuate a vehicle brake release device, and AC coupling means connected in circuit between the output of said amplifier means and the solenoid input.

8. A system as claimed in claim 7 further comprising a diode limiter connected to the output of said amplifier means.

9. A system as claimed in claim 8 wherein said transducer means comprises a disc having a plurality of teeth about its periphery and an electromagnetic pickup element mounted adjacent thereto, and said amplifier means comprises a pair of transistors having their collectors directly connected together and their emitters connected together, and means individually coupling the base electrodes to the pickup element.

10. A system as claimed in claim 9 wherein said AC coupling means comprises a capacitor connected between the collectors of said pair of transistors and the input to the solenoid.